Sept. 29, 1970  KAZUO KITAZAWA  3,531,075
BUTTERFLY VALVE

Filed April 8, 1968  3 Sheets-Sheet 1

INVENTOR
Kazuo Kitazawa
BY Beaman & Beaman
ATTORNEYS

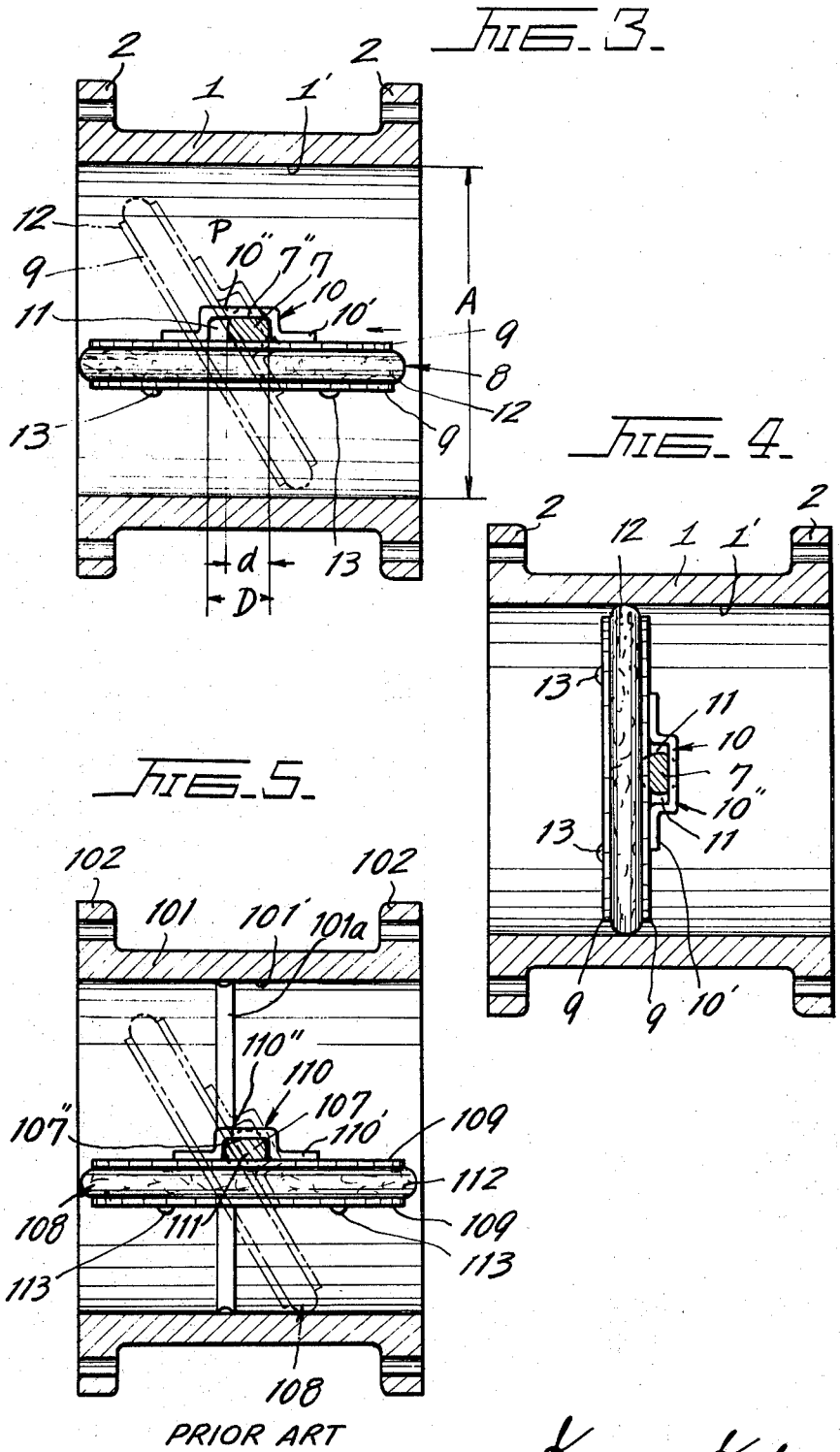

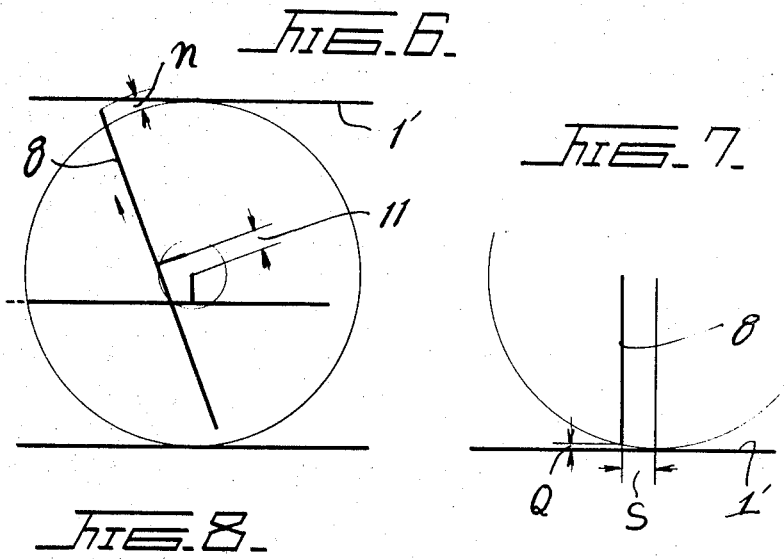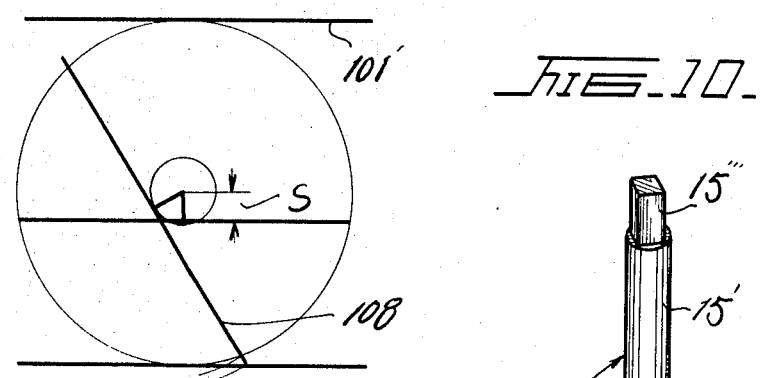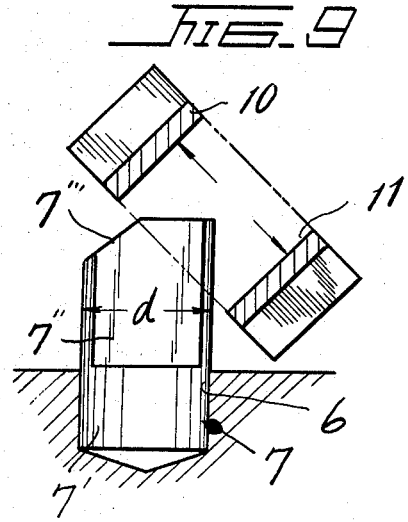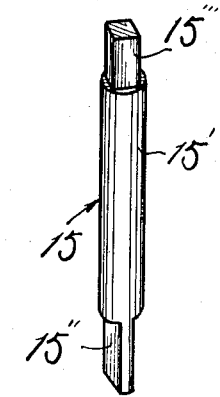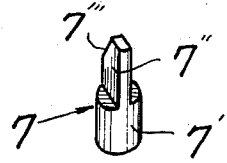

United States Patent Office 3,531,075
Patented Sept. 29, 1970

3,531,075
BUTTERFLY VALVE
Kazuo Kitazawa, 21–13, 2-chome, Ohara, Setagaya-ku,
Tokyo, Japan
Filed Apr. 8, 1968, Ser. No. 719,531
Claims priority, application Japan, Oct. 20, 1967,
42/67,188
Int. Cl. F16k 1/226, 25/00
U.S. Cl. 251—306                                3 Claims

ABSTRACT OF THE DISCLOSURE

A butterfly valve for use in a piping system adapted to transport fluid under high pressure comprising a hollow cylindrical casing having an upwardly projecting neck portion provided with a bore and a recess formed on the inner bottom of the casing in alignment with said bore of the neck portion; a lower driven shaft received in said recess and partially projecting upwardly therefrom; an upper drive shaft received in said bore of the neck portion and partially projecting downwardly into the interior of said casing; a rotary disc assembly rotatably mounted on said shafts in such a manner that the assembly may be allowed to displace with respect to said shafts during the rotation of the assembly in unison with the shafts while maintaining a fluid tight sealing relation between the outer periphery of the disc assembly and the inner periphery of the casing.

BACKGROUND OF THE INVENTION

In a prior art butterfly valve for use in a piping system adapted to transport fluid under high pressure of the type in which a disc assembly is rotatably mounted within a cylindrical casing extended transversely of the casing at right angles with respect to the axis of the casing, in order to maintain a fluid tight sealing relation between the outer periphery of the disc assembly and the inner periphery of the casing it is necessary to provide an integral annular valve seat along and around the inner periphery of the casing for accommodating the outer peripheral edge of an elastomeric packing extending around and on the outer peripheral edge of the disc assembly. The annular valve seat serves to accommodate the outer peripheral edge of the elastomeric packing under a slightly compressed condition when the disc assembly is in its fully closed condition so as to maintain a fluid tight sealing relation throughout the interface between the outer periphery of the disc assembly and the inner periphery of the casing. For the purpose, it is necessary to precisely and integrally mount the annular valve seat along and around the inner periphery of the casing. However, in fact it is very difficult to precisely mount the valve seat along and around the inner periphery in the manner mentioned just above because such precise mounting of the annular valve seat is required.

Furthermore, in the prior art butterfly valve referred to just above, the disc assembly, which includes a pair of discs secured together to each other with a clearance defined therebetween and with an annular elastomeric packing disposed therebetween and outwardly and radially projecting out of the outer peripheral edge of the discs, has to be rotatably mounted within the casing by inserting an upper drive shaft through a bore formed on the top of the casing into the upper half portion of the clearance, inserting a lower driven shaft through a bore formed on the bottom of the casing into the lower half portion of the clearance, applying a blind cover against the bottom of the bottom bore of the casing covering the bore and the area surrounding the bore and finally securing the blind cover to the bottom of the casing by means of bolts or set screws. However, such mounting of the disc assembly within the casing of the prior art butterfly valve in most cases fails to provide a perfect fluid tight sealing relation between the outer periphery of the disc assembly and the inner periphery of the casing leading to the possibly of fluid leakage along the interface.

SUMMARY OF THE INVENTION

The present invention relates to a novel and improved butterfly valve for use in a piping system adapted to transport fluid under high pressure therethrough.

One object of the present invention is to provide a novel and improved butterfly valve which can effectively eliminate the difficulties inherent in the prior art butterfly valve as referred to above.

Another object of the present invention is to provide a butterfly valve which does not require provision of any annular valve seat along and around the inner periphery of the casing of the valve for maintaining a fluid tight sealing relation throughout the interface between the rotary disc assembly and the valve casing.

Another object of the present invention is to provide a butterfly valve which is simple in construction and in operation and which can be simply and easily mounted within the casing of the valve.

According to the present invention, there is provided a butterfly valve for use in a piping system adapted to transport fluid under high pressure comprising a hollow cylindrical casing having on the top a neck portion projecting upwardly therefrom and provided with a through bore communicating with the hollow interior of said casing and on the inner bottom a recess in alignment with said through bore of the neck portion; a lower driven shaft rotatably received in said recess and partially projecting upwardly therefrom; an upper drive shaft rotatably received in said through bore of the neck portion and partially projecting downwardly into said hollow interior of the casing; and a rotary disc assembly mounted within said interior of the casing extending transversely of the casing at right angles with respect to the axis of the casing and including a pair of similar discs secured together in a face to face relation with an annular elastomeric packing interposed therebetween partially and radially projecting out of the outer peripheral edge of said discs for fluid tight sealing contact with the inner periphery of the casing. One of said pair of discs is provided with a pair of shaft receiving members on one side thereof in two diametrically opposite positions adjacent to the outer peripheral edge of the disc and the shaft receiving members have such dimensions and configuration that each of the shaft receiving members may cooperate with said one side of the disc in defining a rectangular section space having the cross section area somewhat greater than the cross section area of the projecting portion of each of the respective shafts whereby said disc assembly may be allowed to displace with respect to said shafts whereby said disc assembly may be allowed to displace with respect to said shafts during the rotation of the disc assembly in unison with the shafts while maintaining a fluid tight sealing relation between the outer periphery of the disc assembly and the inner periphery of said casing.

The above and other objects and attendant advantages of the present invention will be apparent to those skilled in the art from a reading of the following description and claims in conjunction with the accompaying drawings which constitute part of this specification.

BRIEF DESCRIPTION OF THE DRAWINGS

FIG. 3 is a cross sectional view taken along substantially the III—III line of FIG. 2 illustrating said valve disc assembly in its fully opened and partially opened positions, respectively;

FIG. 4 is similar to FIG. 3, but illustrates said disc assembly in its closed position;

FIG. 5 is similar to FIG. 3, but shows a prior art butterfly valve;

FIGS. 6 and 7 are diagrammatic views which explain the operation of said valve disc assembly in the positions of the assembly as shown in FIGS. 3 and 4, respectively;

FIG. 8 is a diagrammatic view which explains the operation of said valve disc assembly in the position of the assembly as shown in FIG. 5;

FIG. 9 is an enlarged fragmentary elevational view in partial section illustrating the manner by which one shaft receiving member of said valve disc assembly is put on a lower driven shaft; and FIG. 10 is a fragmentary perspective view of an upper drive shaft and said lower driven shaft.

PREFERRED EMBODIMENT OF THE INVENTION

Figure 1:
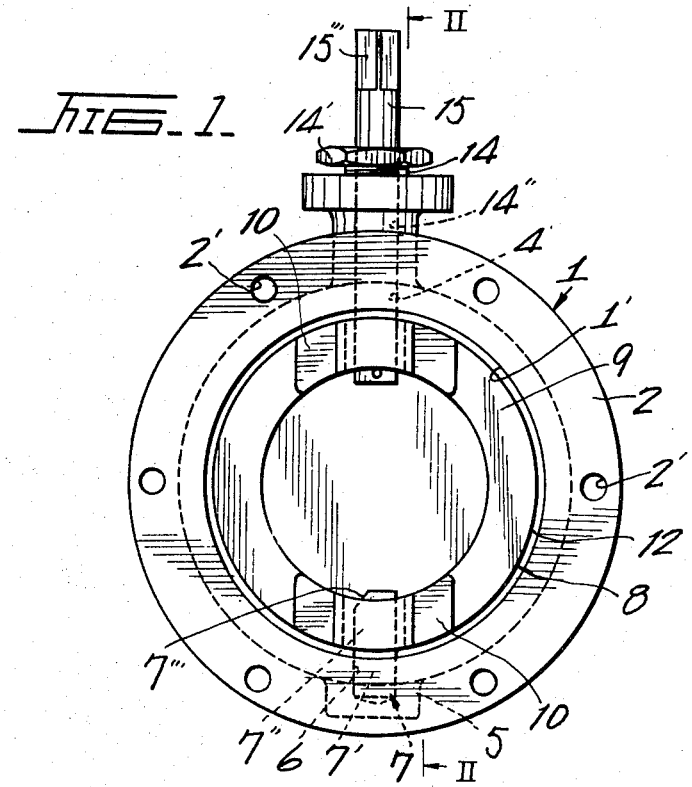
FIG. 1 is an end elevational view of a preferred form of butterfly valve constructed in accordance with the present invention.
Figure 2:
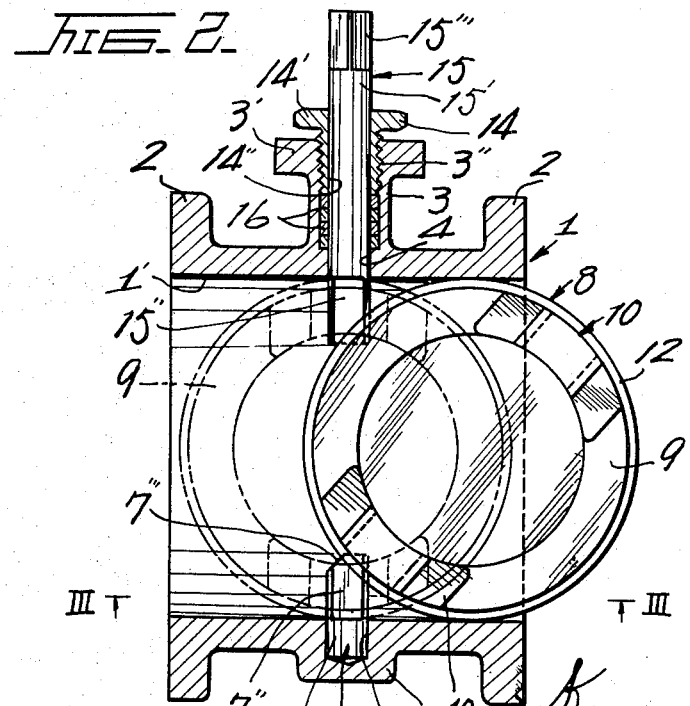
FIG. 2 is a vertical sectional view taken along substantially the II—II line of FIG. 1 and as seen in the arrow direction therein which also illustrates the manner by which a valve disc assembly is inserted into the hollow cylindrical casing of said butterfly valve.

The present invention will be now described referring to the various figures of the accompanying drawings and especially to FIGS. 1 to 4 thereof in which one preferred form of butterfly valve embodying the present invention is illustrated. The novel butterfly valve generally comprises a hollow cylindrical casing or main body 1 which defines an open cylindrical chamber or opening 1' therein. The casing 1 has at the opposite ends integral annular flanges 2 and 2 each having a plurality of spaced through bores 2' for connection to the flanges (not shown) of opposite and adjacent pipes (not shown) disposed in alignment with each other and with the butterfly valve in a piping system which is adapted to transport hydraulic fluid under high pressure therethrough. The cylindrical casing or main body 1 is further provided with an integral hollow neck portion 3 upwardly extending at the top on the outer periphery substantially centered between the opposite end flanges 2 and the neck portion has an integral flange 3' at the upper end and a threaded center bore 3" extending through the length or height of the neck portion 3. The center bore 3" in the neck portion 3 communicates at the lower end with the chamber 1' of the casing 1 through a plain bore 4 formed in the casing right below the lower end of the center bore 3" of the neck portion 3 in alignment with the neck portion bore and having a diameter smaller than that of the neck portion bore 3". The cylindrical casing 1 is further provided with a boss 5 at the bottom on the outer periphery in alignment with the neck portion 3. A cylindrical recess 6 is formed on the inner peripheral surface of the casing 1 opposite to and with the top bore 4 and the recess has a diameter substantially the same as that of the top bore 4. The recess 6 is adaped to freely receive a lower driven shaft 7 in the form of a substantially circular section bar having a circular section shank 7' adapted to be received in the recess 6 and an integral rectangular section flattened end portion 7" one end edge of which is bevelled as shown by 7'''. When the butterfly valve is assembled, the lower driven shaft 7 is rotatably received in the cylindrical recess 6 with the shank 7' disposed within the recess 6 and the flattened end portion 7" projecting upwardly of the recess toward the axis of the chamber 1".

A rotary valve disc assembly 8 comprising a pair of similar circular discs 9 and 9 each having the diameter slightly smaller than that of the chamber 1' is rotatably mounted within the chamber 1' extending transversely of the chamber at right angles with respect to the axis of the chamber in the manner which will be described hereinbelow. Each of the discs 9 has a substantially U-shape section with a circular center recess (not shown) formed therein and in assembling the valve disc assembly 8, the two discs 9 are put together in a face to face relation with the bottoms of the center recesses thereof abutting against each other so as to form an annular opening (not shown) between the opposite surfaces or sides of the discs adjacent to the outer peripheral edges thereof. One of the pair of discs has a pair of similar shaft receiving members 10 and 10 each having a substantially U-shape section secured to one side of the associated disc by means of welding or any other suitable way. The pair of shaft receiving members 10 are disposed on one side of the one disc 9 in diametrically opposite and spaced positions adjacent to the outer peripheral edge of the associated disc. Each of the shaft receiving members 10 is secured to one side of the one disc 9 in such a manner that the outwardly and laterally extending opposite leg portions 10' and 10' of the U-shape construction may abut against the adjacent side of the one particular disc 9 with the intermediate portion 10" being spaced from the same adjacent side of the disc thereby to define a rectangular section space 11 between the adjacent sides of the particular disc and the intermediate portion and the function of the space constitutes an important feature of the present invention as will be described hereinbelow. The shaft receiving members 10 have such shape and configuration that when they are secured to the adjacent side of the particular one disc 9 the above-mentioned side of the disc and the inner side of the intermediate portion 10' of the U-shape construction may be spaced from each other by a distance substantially corresponding to the thickness or width of the rectangular section flattened end portion 7" of the above-mentioned lower driven shaft 7 or the thus formed rectangular section space 11 may have the width substantially corresponding to the width or thickness of the lower shaft flattened end portion 7", and that the space 11 also may have the length somewhat greater than the length or each of the longer sides of the rectangular section configuration of the lower shaft flattened end portion 7". In fabricating the rotary disc assembly 8, the pair of discs 9 are put together in a face-to-face relation with the U-shape section shaft receiving members 10 on one of the discs disposed outward and with an annular elastomeric packing 12 received within the above-mentioned annular opening between the adjacent sides of the confronting discs 9 and then a plurality of set screws 13 are threaded through the discs and packing thereby to secure the elements together into a unitary unit. The annular elastomeric packing 12 has the outer diameter slightly greater than that of the discs 9 so that when the packing is received or seated within the above-mentioned annular opening between the confronting discs the outer peripheral edge of the packing may project radially and outwardly of the outer peripheral edges of the discs for the purpose as will be described hereinbelow.

The center threaded bore 3" of the neck portion 3' threadably receives a tubular upper shaft holding member 14 having an annular flange 14' at the upper end and a through thread 14" on the outer periphery for the purpose as will be described hereinbelow. A stack of annular packings 16 is disposed around the upper shaft 15 between the lower end of the tubular member 14 and the top of the casing 1.

In mounting the valve disc assembly 8 into the chamber 1' of the casing 1, the lower driven shaft 7 is first inserted within the recess 6 with the flattened end portion 7″ having the beveled edge 7″ projecting upwardly of the recess toward the axis of the chamber. Then, the valve disc assembly 8 is forced into the chamber 1′ by sliding down one of the diametrically opposite shaft receiving members 10 of the particular one disc 9 along the flattened end portion 7″ of the lower shaft 7 until the bottom of the particular shaft receiving member 10 abuts against the shoulder formed at the juncture between the circular section shank 7′ and flattened end portion 7″. Such sliding of the shaft receiving member 10 along the flattened end portion 7″ may be facilitated by the fact that the flattened end portion 7″ is provided with the bevelled one edge 7‴ and the length D of the rectangular section space 11 is greater than the length d of the rectangular section construction of the flattened end portion 7″ (see FIG. 9). When the particular shaft receiving member bottom abuts against the above-mentioned shoulder on the lower driven shaft 7, simultaneously the other shaft receiving member 10 of the same one disc 9 is positioned substantially in alignment with the plain bore 4 in the cylindrical casing 1. Then, an upper drive shaft 15 in the form of a bar having a circular section shank 15′ provided at one end with a rectangular section flattened end portion 15″ and at the opposite end with a polygonal section end portion 15‴ is inserted through the center opening 14″ and the top bore 4 in the casing 1 (the diameter of the opening and bore 14″ and 4 is greater than that of the upper shaft shank 15′) with the flattened end portion 15″ directing downward until the shoulder formed at the juncture between the shank 15′ and flattened end portion 15″ abuts against the packing 12 whereby the flattened end portion 15″ may be received within the other or now upper shaft receiving member 10. The flattened end portion 15″ of the upper drive shaft 15 has the same dimensions and same rectangular section construction as those of the flattened end portion 7″ of the lower driven shaft 7 except that the upper shaft flattened end portion 15″ has no bevelled edge. When the upper drive shaft 15 is inserted in the manner as mentioned just above, the valve disc assembly 8 may be held in its operative position within the casing 1 at right angles with respect to the axis of the chamber 1′ and the disc assembly may be rotated in any desired direction at right angles with respect to the axis of the chamber 1′ while the annular packing 12 maintaining a fluid tight sealing relation with the inner peripheral surface of the casing 1. As mentioned above, since the two diametrically opposite shaft receiving members 10 have the same configuration and size, the positions of these members may be easily inverted without affecting upon the operation of the disc assembly 8. Although the annular packing 12 has the diameter greater than that of the discs 9, the mounting of the disc assembly 8 into the chamber 1′ can be effected without difficulties because the packing is formed of an elastomeric material which yields elastically when the assembly is inserted into the casing 1 and by virtue of the yielding compression of the packing the disc assembly can at all times maintain a fluid tight sealing relation with respect to the inner peripheral surface of the casing 1 whatsoever operative position the disc assembly may assume within the chamber 1′ in actual use.

As understood from the foregoing, when the valve disc assembly 8 is mounted in the chamber 1′ of the casing 1 in the manner as mentioned above, the vertical axis of the disc assembly is disposed eccentric with respect to the axis of the lower and upper shafts 7 and 15 by the distance shown with reference character S in FIG. 7. In FIG. 3 reference character A denotes the diameter of the chamber 1′ and in FIG. 6 reference character n denotes the difference in length between the rectangular section construction of the flattened end portion 7″ or 15″ (or the distance by which the disc assembly is allowed to displace with respect to the lower and upper shafts) and the rectangular section configuration of each space 11 while reference character Q in FIG. 7 denotes the difference between the diameter of each disc 9 and the diameter A of the chamber 1′.

In operation, the operator grips the operation handle (not shown) at the free end portion thereof which is opposite to the end having a polygonal opening (not shown) and received on the mating hexagonal end portion 15‴ of the upper drive shaft 15 and then turns the handle in a desired direction so as to rotate the upper drive shaft 15 which in turn rotates disc assembly 8 in the same direction. The rotational movement of the disc assembly 8 is transferred to the lower drive shaft 7 to rotate the shaft in the same direction whereby the shafts and disc assembly may rotate in unison with one another. In FIG. 3, the fully opened position of the disc assembly 8 is shown by the solid line and a partially opened position of the assembly is shown by the two dot-chain line. In this partially opened position, fluid under pressure which flows into the butterfly valve in the directions indicated by arrows in FIG. 3 may be allowed to flow out of the butterfly valve in the direction as indicated by the arrow P in the same figure. In FIG. 4, the disc assembly is shown in its fully closed or fluid tight sealing position in which no fluid is allowed to pass through the butterfly valve.

As the shafts 7 and 15 and disc assembly 8 rotate together in the manner as mentioned just above, the disc assembly may be allowed to displace with respect to the shafts subject to the pressure of fluid which will be applied against the disc assembly because of the presence of the spaces 11 around the shafts 7 and 15.

FIG. 5 illustrates a prior art butterfly valve in section and the prior art butterfly valve is substantially similar to the novel butterfly valve as shown in FIGS. 1 to 4, FIGS. 6 and 7, and FIGS. 9 and 10 except that the dimensions of the spaces defined between one side of one particular disc having a pair of U-shape section shaft receiving members secured thereto and the adjacent side of the intermediate portion of each shaft receiving member. In this prior art butterfly valve, each of the shaft receiving members 110 secured to one side or the outer side of one of the pair of discs 109 is so dimensioned that the inner side of the intermediate portion 110″ connecting the outwardly and laterally extending opposite leg portions 110′ cooperates with the adjacent side of the particular one disc 109 in defining a rectangular section space 111 which has substantially the same configuration and dimensions as those of the flattened end portion of the lower or upper shaft (in FIG. 5, the flattened end portion 107″ of the lower shaft 107 is shown) whereby there is no clearance n present between the space 111 and the shaft as in the novel butterfly valve (see FIG. 8) and as a result, the valve disc assembly 108 may not be allowed to displace with respect to the shafts while they are rotating together. And since the vertical axis of the disc assembly is mounted eccentric with respect to the axis of the shafts, if the discs of the disc assembly are designed so as to have a diameter large sufficient to allow the packing disposed therebetween to directly contact the inner peripheral surface of the casing without the provision of any annular valve seat along and around the inner peripheral surface of the casing for accommodation of the outer peripheral edge of the packing, the disc assembly would firmly abut against the inner peripheral surface of the casing during the rotation of the disc assembly and the rotation of the disc assembly would be arrested by the casing (see FIG. 8). In order to eliminate the above difficulty, in the prior art butterfly valve as illustrated in FIG. 5 the discs of the disc assembly have to be designed so as to have a rather small diameter to such a degree that the packing may not be allowed to directly contact the inner peripheral surface of the casing and provision of annular valve seat 101a along and around the inner peripheral surface of the casing is necessary to compensate for the reduction in the diameter of the discs whereby a fluid tight sealing relation is established between the outer periphery of the disc assembly and the inner periphery of the casing while allowing the disc assembly to rotate smoothly.

However, according to the present invention, as mentioned above, since the disc assembly 8 is so designed that the discs have the diameter large sufficient to allow the packing to directly contact the inner peripheral surface of the casing and the assembly may displace with respect to the shafts 7 and 15 by the distance $n$ provided by the difference between the length of the rectangular configuration of the spaces 11 and that of the rectangular configuration section of the flattened end portions 77″ and 15″ of the shafts 7 and 15, the disc assembly may rotate smoothly in direct contact with the inner peripheral surface of the casing 1 while maintaining a fluid tight sealing relation with the casing without the necessity for provision of any annular valve seat along and around the inner periphery of the casing whereby the operation of the butterfly valve may be greatly facilitated and the construction of the butterfly valve may be simplified resulting in reduction of expenses for manufacturing the butterfly valve.

The present disclosure includes that contained in the appended claims as well as that of the foregoing description.

What I claim is:

1. A butterfly valve for use in a piping system adapted to transport fluid under high pressure comprising, in combination, a hollow casing having a cylindrical bore, a first stub shaft rotatably mounted in said casing and having a rectangular end projecting into said bore, a second stub shaft rotatably mounted in said casing having a rectangular end projecting into said bore in diametrical opposed relation to said first shaft, means for rotating said second shaft, a rotary valve disk assembly mounted within said casing bore having a diametrical axis of rotation at right angles with respect to the axis of said casing bore and an outer periphery for selectively establishing sealing contact with the inner surface of the casing bore, said valve disk assembly being provided with a pair of shaft receiving members on one side thereof at two diametrically opposite positions adjacent the outer periphery of the assembly, said shaft receiving members each defining a rectangular opening receiving the rectangular end of one of said shafts, said first shaft end including an end surface and a pair of substantially parallel, spaced, side surfaces, a beveled surface defined on said first shaft end obliquely disposed to the axis of said first shaft substantially perpendicularly intersecting said side surfaces and intersecting said end surface to accommodate receiving the associated shaft receiving member during assembly.

2. A butterfly valve for use in a piping system as in claim 1 wherein said rotary valve disk assembly includes a pair of similar disks secured together in a face-to-face relation with an annular elastomeric packing interposed therebetween and radially projecting beyond the outer peripheral edge of said disks for selective fluid-tight sealing contact with the inner peripheral surface of the casing bore, said pair of shaft receiving members being defined on one of said disks.

3. A butterfly valve for use in a piping system as in claim 2 wherein the rectangular opening defined in each of said shaft receiving members includes a dimension parallel to the plane of the associated disk greater than the dimension of the rectangular shaft end received wherein said disk assembly is allowed to displace with respect to said shafts subject to the pressure of said fluid during the rotation of the disk assembly in unison with the shafts while maintaining a fluid-tight sealing relation between the outer periphery of the disk assembly and the inner periphery of said casing bore.

References Cited

UNITED STATES PATENTS

| | | | |
|---|---|---|---|
| 2,027,978 | 1/1936 | Hoff | 251—306 |
| 3,111,300 | 11/1963 | Boone | 251—306 |
| 3,192,945 | 7/1965 | Blakeley | 251—84 XR |

FOREIGN PATENTS

| | | |
|---|---|---|
| 1,300,519 | 6/1962 | France. |

HENRY T. KLINKSIEK, Primary Examiner

U.S. Cl. X.R.

251—84